US011900065B1

United States Patent
Sullivan et al.

(10) Patent No.: US 11,900,065 B1
(45) Date of Patent: *Feb. 13, 2024

(54) AUTOMATED EXPRESSION PARALLELIZATION

(71) Applicant: Appian Corporation, Reston, VA (US)

(72) Inventors: Brian Joseph Sullivan, Bethesda, MD (US); Matthew David Hilliard, McLean, VA (US)

(73) Assignee: Appian Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,156

(22) Filed: Jul. 1, 2022

Related U.S. Application Data

(63) Continuation of application No. 16/442,649, filed on Jun. 17, 2019, now Pat. No. 11,379,667, which is a
(Continued)

(51) Int. Cl.
*G06F 40/211* (2020.01)
*G10L 15/26* (2006.01)
(Continued)

(52) U.S. Cl.
CPC ........... *G06F 40/30* (2020.01); *G06F 9/46* (2013.01); *G06F 16/2246* (2019.01);
(Continued)

(58) Field of Classification Search
None
See application file for complete search history.

(56) References Cited

U.S. PATENT DOCUMENTS 7,836,390 B2 * 11/2010 Lin ................. G06F 40/169
715/233
9,454,571 B2 * 9/2016 Grosse ............ G06F 16/24542
(Continued)

OTHER PUBLICATIONS

Bone, "Automatic Parallelism for Mercury," The University of Melbourne, National ICT Australia, Ph.D. Completion Seminar, dated May 2, 2012, 49 pages.
(Continued)

*Primary Examiner* — Seong-Ah A Shin
(74) *Attorney, Agent, or Firm* — Fish & Richardson P.C.

(57) ABSTRACT

A system is capable of automatically adjusting or reconstructing a baseline expression to generate a parallelized expression. Evaluation of the parallelized expression provide a substantially similar output as the evaluation of the baseline query in more efficient manner. In some implementations, data indicating an expression to be evaluated on a primary thread of the one or more processors is obtained. Elements of the expression are identified. The elements are grouped into a parse tree representation. Elements of the expression are classified as belonging to either a first category that includes elements that are eligible for parallel processing or a second category that includes elements that are not eligible for parallel processing. A particular element that is classified as belonging to the first category is identified and evaluated on a non-primary thread of the one or more processors. The non-primary thread is evaluated in parallel with the primary thread.

20 Claims, 7 Drawing Sheets

Related U.S. Application Data continuation of application No. 15/919,908, filed on Mar. 13, 2018, now Pat. No. 10,325,022.

(51) Int. Cl.
*G06F 40/30* (2020.01)
*G06F 16/28* (2019.01)
*G06F 16/22* (2019.01)
*G06F 9/46* (2006.01)
*G06F 16/2453* (2019.01)
*G06F 40/205* (2020.01)

(52) U.S. Cl.
CPC ...... *G06F 16/24532* (2019.01); *G06F 16/285* (2019.01); *G06F 40/205* (2020.01)

(56) References Cited

U.S. PATENT DOCUMENTS

| | | | |
|---|---|---|---|
| 10,325,022 B1 | 6/2019 | Sullivan et al. | |
| 11,379,667 B1 | 7/2022 | Sullivan et al. | |
| 2003/0037048 A1* | 2/2003 | Kabra | G06F 16/24542 |
| 2004/0111408 A1* | 6/2004 | Caudill | G06F 16/3347 |
| | | | 707/E17.08 |
| 2011/0125730 A1* | 5/2011 | Bordawekar | G06F 16/24532 |
| | | | 707/718 |
| 2011/0225285 A1* | 9/2011 | Patel | G06F 9/4856 |
| | | | 718/1 |
| 2014/0236571 A1* | 8/2014 | Quirk | G06F 40/211 |
| | | | 704/9 |
| 2014/0380322 A1* | 12/2014 | Ailamaki | G06F 9/5066 |
| | | | 718/102 |
| 2015/0032680 A1* | 1/2015 | Cichosz | G06N 5/04 |
| | | | 706/50 |
| 2015/0127324 A1* | 5/2015 | Mitchell | G06F 40/295 |
| | | | 704/9 |
| 2016/0098387 A1* | 4/2016 | Bruno | G06F 40/30 |
| | | | 704/9 |
| 2018/0329952 A1* | 11/2018 | Ramachandra | G06F 16/90335 |
| 2019/0163821 A1* | 5/2019 | Pal | G06F 16/27 |
| 2020/0342053 A1* | 10/2020 | Mwarabu | G06N 3/08 |

OTHER PUBLICATIONS chapel-lang.org [online], The Chapel Parallel Programming Language, [retrieved on Apr. 2, 2019], retrieved from: https://cliapel-lang.orgl, 1 page.

parasail-lang.org [online], PamSail Programming Language, [retrieved on Apr. 2, 2019], retrieved from: irtips://aciacore.githublol araSaill, 5 pages.

x10-lang.org [online], The X10 Programming Language, X10: Performance and Productivity at Scale, [retrieved on Apr. 2, 20191, retrieved from: tp://xO-iaot.org/, 3 pages.

* cited by examiner

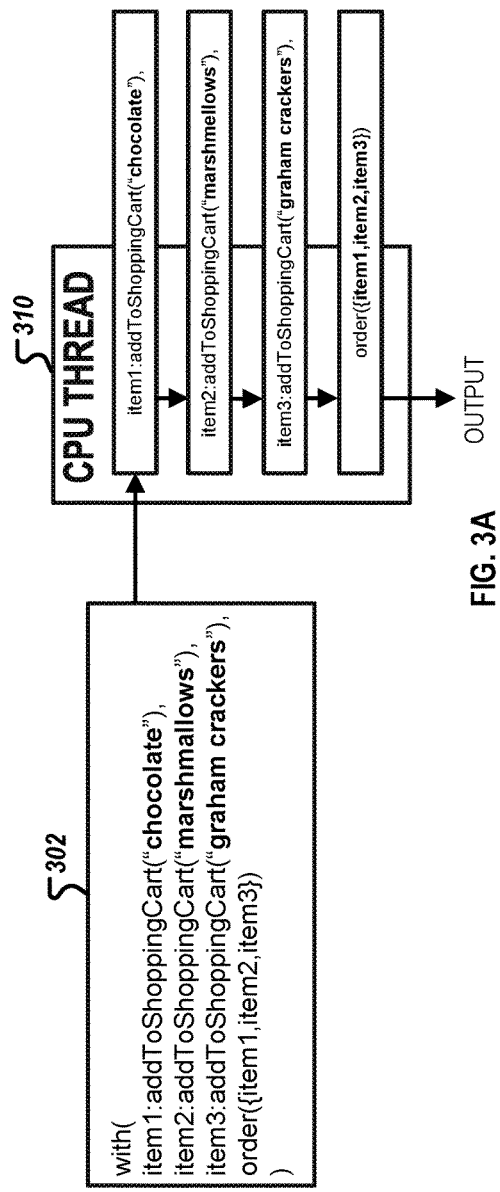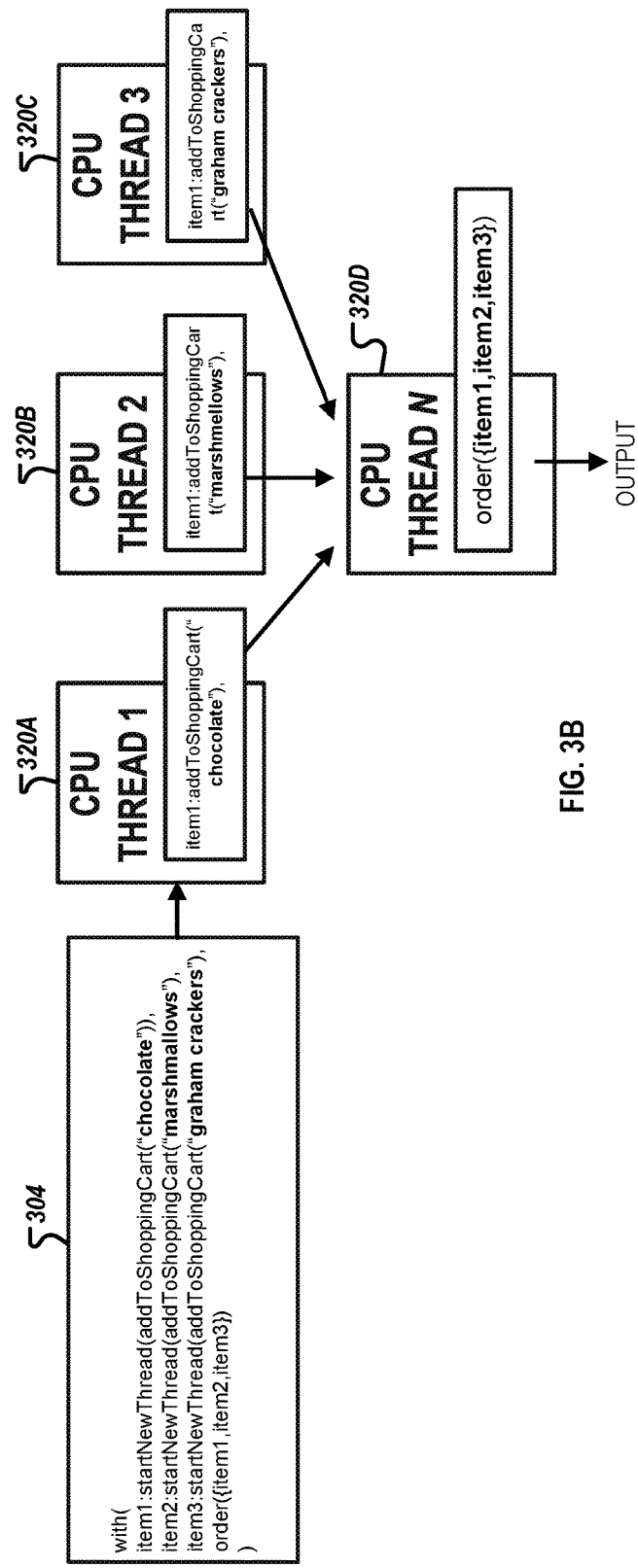
FIG. 3A
FIG. 3B

AUTOMATED EXPRESSION PARALLELIZATION

CROSS-REFERENCE TO RELATED APPLICATIONS

This application is a continuation of U.S. application Ser. No. 16/442,649, filed Jun. 17, 2019, now allowed, which is a continuation of U.S. application Ser. No. 15/919,908, filed Mar. 13, 2018, now U.S. Pat. No. 10,325,022, issued Jun. 18, 2019. The disclosure of each of the foregoing applications is incorporated herein by reference.

TECHNICAL FIELD

This specification generally relates to application software.

BACKGROUND

Software developers may develop expressions to be evaluated by software applications to perform various tasks. For example, software application may run programming language that interprets, e.g., according to its particular rules of precedence and of associates, elements of an expression to produce a value that represent the output of evaluating the expression.

SUMMARY

In some implementations, a system is capable of automatically adjusting or reconstructing a baseline expression to be evaluated on a thread of a processor or a processor core. The system can generate a parallelized expression based on adjusting or reconstructing the baseline query. Evaluation of the parallelized expression can be used to provide a substantially similar output as the evaluation of the baseline query in more efficient manner e.g., producing the same value, constant, or variable. For example, during evaluation of the parallelized expression, one or more elements of the parallelized expression can be evaluated in parallel in multiple threads of a processor or a processor core to reduce the total time required to evaluate the expression. Additionally, the system is capable of adjusting or reconstructing the baseline query without any user input, reducing the likelihood of a software developer incorrectly adjusting or reconstructing the baseline expression.

To generate the parallelized expression, the system initially receives text of the baseline expression as input. The system parses the text to identify elements of the expression, such as explicit values, constants, variables, operators, and/or functions that a programming language interprets and computes to produce (or "return" in a stateful environment) a value that represents the output of the expression. The system groups the identified elements into a parse tree representation that includes a hierarchal structure of nodes to which the identified elements are assigned. The parse tree representation can identify computational dependencies of individual elements that impacts an order in which elements are evaluated during the evaluation of the expression. The system classifies each element as representing an element that is eligible for parallelization or an element that is not eligible for parallelization. For example, an input/output-bound (I/O-bound) function that requires accessing an external resource, e.g., a remote web service, can be classified as being eligible for parallelization, whereas a CPU-bound function that operates solely on local resources, e.g., operating system resources, can be classified as being not eligible for parallelization. During evaluation of the parallelized expression, the system can evaluate elements that are classified as being eligible for parallelization on separate threads to improve the evaluation performance, as discussed above.

This technology can be leveraged to allow a computing system to evaluate expressions, e.g., expressions to be evaluated for business process management software, to reduce the time and/or processing requirements necessary to evaluate an expression. For example, by evaluating one or more elements of the parallelized expression on multiple threads of a processor or multiple threads of a processor core, the computing system can reduce the time needed to complete evaluation, thereby more efficiently evaluating an expression. As another example, the computing system can use automated techniques (i.e., without user input) to identify elements that, if evaluated on a separate thread, would not impact the overall output of the expression. The classification of elements that are candidates for parallelization can be used to automatically generate parallelized expressions so that a developer does not need to investigate the appropriate modifications that are necessary to make a baseline expression (i.e., an expression with sequentially evaluated elements).

Additionally, the system is capable of dynamically selecting the appropriate method for generating the parallelized expression based on evaluating the computational requirements to generate the parallelized expression relative to the potential computational improvements that result from evaluating the parallelized expression relative to a baseline expression. For example, if the processing requirement to generate a parallelized expression as a new expression is high or if the potential processing improvement of the new expression is low, the system may insert parallelization code into the baseline expression to reduce the complexity of generating a parallelized expression, e.g., a baseline expression with inserted parallelization code. In other examples, if the processing requirement to generate the parallelized expression as a new expression is low (and/or if the potential processing improvement of the new expression is high), the system may reconstruct the baseline expression using its identified elements to generate a new expression that can be evaluated more efficiently using multiple threads compared to evaluation of the baseline expression on a single thread.

In some implementations, the system is capable of using specific classification criteria to further improve the process of generating the parallelized expression. The system can evaluate attributes of the elements of a baseline expression to determine if a particular element should be evaluated on a separate thread. For example, an I/O-bound function that consumes greater processing resources than typical CPU-bound functions can be evaluated in a separate thread to improve the overall evaluation performance of the parallelized expression since the system determines that the I/O-bound function may be a performance bottleneck if evaluated sequentially on a single thread. As another example, the system may evaluate dependencies of individual elements and evaluate elements that are not computationally dependent on one another, e.g., functions applied to independent arguments, in separate threads so that elements can be evaluated substantially simultaneously in parallel to reduce the time required to evaluate the parallelized expression.

In one aspect, a computer-implemented method can include: obtaining data indicating an expression to be evaluated on a primary thread of the one or more processors; identifying elements of the expression; grouping the elements into a parse tree representation, the parse tree representation comprising a hierarchal structure of nodes and the parse tree representation reflecting an assignment of element to nodes of the parse tree representation based on a particular sequence of evaluating the elements of the expression; classifying, sequentially along the hierarchal structure of nodes, individual elements as belonging to either a first category that includes elements that are eligible for parallel processing or a second category that includes elements that are not eligible for parallel processing; identifying a particular element that is classified as belonging to the first category; and in response to identifying the particular element as belonging to the first category, evaluating at least the particular element on a non-primary thread of the one or more processors, the non-primary thread being evaluated in parallel with the primary thread.

One or more implementations can include the following optional features. For example, in some implementations, the particular element is assigned to a particular node; the particular node has one or more child nodes within the hierarchal structure of nodes; and evaluating at least the particular element on the non-primary thread of the one or more processors includes evaluating elements assigned to the one or more child nodes of the particular node on the non-primary thread of the one or more processors.

In some implementations, the hierarchal structure of nodes includes (i) a root node, and (ii) intermediate nodes descending within the hierarchal structure from the root node; the intermediate nodes comprise one or more intermediate nodes having one or more child nodes descending within the hierarchal structure from the one or more intermediate nodes; and classifying the elements includes: determining, for an intermediate node to which an element is assigned, one or more child nodes associated with the intermediate node, classifying the elements assigned to the one or more child nodes, determining a composite classification for the intermediate node based on classifying the elements assigned to the one or more child nodes, and classifying the element assigned to the intermediate node based on the composite classification.

In some implementations, the method further includes: reconstructing, based on the parse tree representation, a text segment of the expression to generate a text segment for a transformed expression, the transformed expression specifying evaluation of one or more elements from among the identified elements of the expression on the non-primary thread; and providing data indicating the text segment for the transformed expression for output to a computing system.

In some implementations, the method further includes: determining a particular sequence to evaluate the elements of the transformed expression based on the grouping of the identified elements into the parse tree representation; and providing, for output to the computing system, an instruction specifying the particular sequence to evaluate the elements of the transformed expression.

In some implementations, the text segment for the baseline expression does not include text corresponding to parallelization code; and the text segment for the transformed expression includes a portion corresponding to parallelization code.

In some implementations, the text segment for the baseline expression is specified by a user input provided through a user interface for a developer application.

In some implementations, the first category of elements includes input/output-bound (IO-bound) elements; and the second category of elements includes processor-bound elements.

In some implementations, the elements of the expression comprise a first element that is classified as belonging to the first category, and a second element that is classified as belonging to the second category; the first element is assigned to a first child node of a particular intermediate node within the parse tree representation; the second element is assigned to a second child node of the particular intermediate node within the parse tree representation. In such implementations, the method further includes providing, for output to a computing system, an instruction specifying a particular sequence to evaluate the second element prior to evaluating the first element.

In some implementations, the method further includes: determining that evaluation of an element assigned to a first child node of a particular intermediate node is not computationally dependent on evaluation of an element assigned to a second child of the particular intermediate node; and in response to determining that evaluation of the element assigned to the first child node is not computationally dependent on evaluation of the element assigned to the second child node, generating an instruction that, when received by the computing system, causes the one or more processors to perform operations. The operations include evaluating the element assigned to the first child node on the primary thread, and evaluating the element assigned to the second child node on the non-primary thread.

In some implementations, the method further includes: determining that evaluation of an element assigned to a first child node of a particular intermediate node is computationally dependent on evaluation of an element assigned to a second child of the particular intermediate node; determining that evaluation of an element assigned to a third child node of the particular intermediate node is not computationally dependent on evaluation of an element assigned to the second child of the particular intermediate node; and in response to determining that evaluation of the element assigned to the first child node is not computationally dependent on evaluation of an element assigned to a second child node, generating an instruction that, when received by the computing system, causes the one or more processors to perform operations. The operations include: evaluating the element assigned to the third child node on the primary thread, evaluating the element assigned to the second child node on the non-primary thread, and based on evaluating the element assigned to the second child node, evaluate the element assigned to the first child node on the non-primary thread.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 3A illustrates an example of evaluating an un-parallelized expression.

FIG. 3B illustrates an example of evaluating a parallelized expression that is generated based on an un-parallelized expression.

In the drawings, like reference numbers represent corresponding parts throughout.

DETAILED DESCRIPTION

Figure 1:
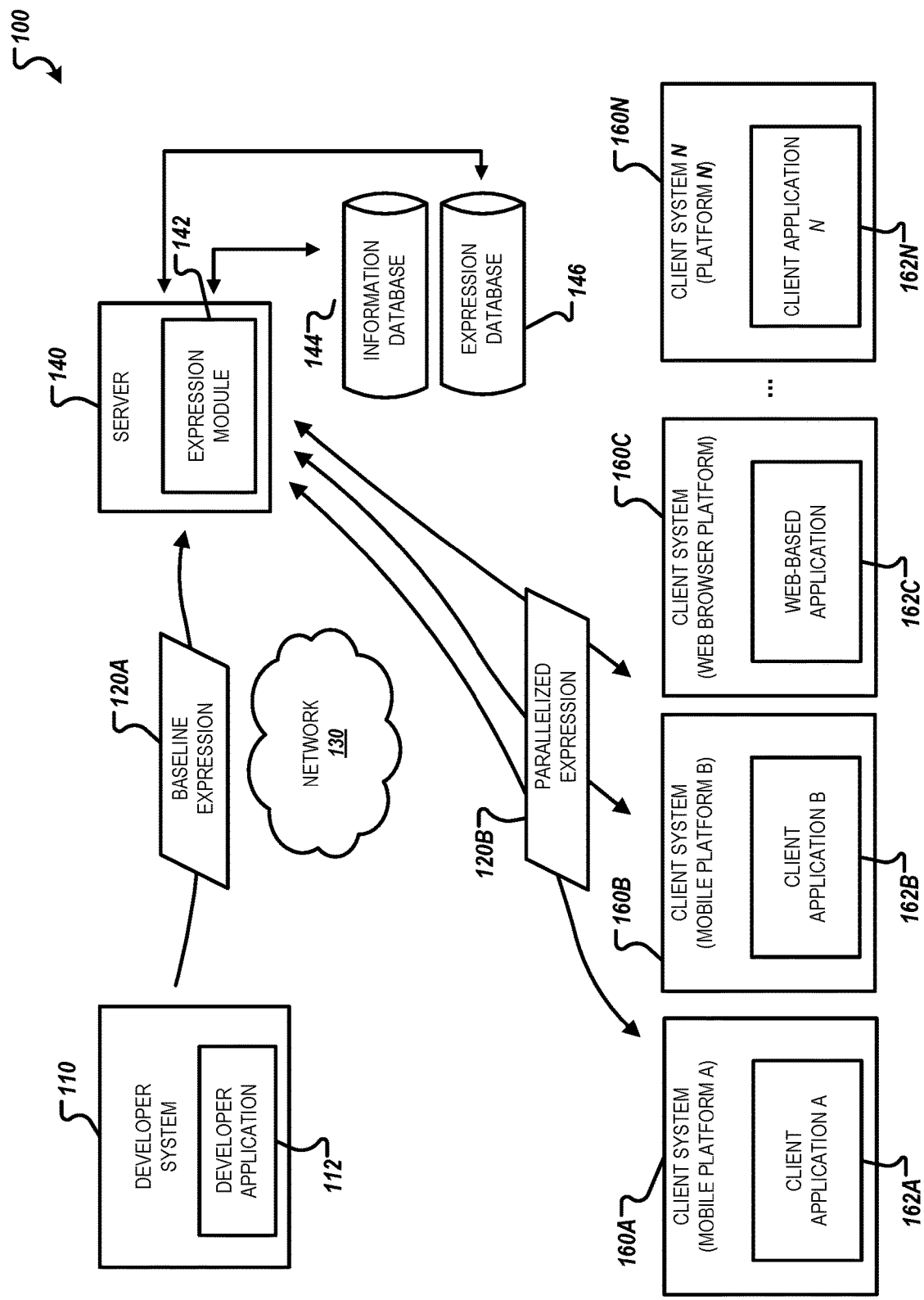
FIG. 1 illustrates an example of a system 100 that is capable of evaluating elements of an expression on multiple threads of a processor.

This specification generally describes methods and systems for automatically adjusting or reconstructing a baseline expression to be evaluated on a thread of a processor or a processor core. The system can generate a parallelized expression based on adjusting or reconstructing the baseline query. Evaluation of the parallelized expression can be used to provide a substantially similar output as the evaluation of the baseline query in more efficient manner e.g., producing the same value, constant, or variable. For example, during evaluation of the parallelized expression, one or more elements of the parallelized expression can be evaluated in parallel in multiple threads of a processor or a processor core to reduce the total time required to evaluate the expression. Additionally, the system is capable of adjusting or reconstructing the baseline query without any user input, reducing the likelihood of a software developer incorrectly adjusting or reconstructing the baseline query.

As discussed herein, an "expression" refers to a string of characters in a programming language (or scripting language) that are intended to return a value and/or perform a specified action. For example, an expression can represent a combination of elements, such as one or more explicit values, constants, variables, operators, and/or functions that the programming language interprets and computes to produce (or return in a "stateful" environment) another value. Evaluation of an expression refers to the interpretation and computation of the expression by the programming language to return the intended value. For example, an expression "2+3" is evaluated to produce an output with the value "5."

An expression, as discussed herein, can provide different types of output based on the combination of values, constants, variables, operators, and/or functions. For example, an expression can return a numerical value of an arithmetic operation, e.g., "1+2" returning value "3." In another example, the expression can return a value representing a Boolean data type, e.g., "2<3" returning value "true." In some examples, the expression can return a value resulting from the evaluation of a program function, e.g., "read_file ('abc.txt')" returning value representing the contents of "abc.txt."

As discussed herein, a "thread" refers to a smallest sequence of programmed instructions that can be managed independently by a scheduler of an operating system. A thread provides independent evaluation of the programmed instructions using shared data on a central processing unit (CPU). In some instances, a thread can be evaluated on a "core" (or independent evaluation unit) of a CPU. A thread, from a user's perspective, is typically used by a single program (i.e. a collection of instructions that performs a specific task when executed by a computing device). Multiple threads can be used by computing device for servicing multiple programs to perform multiple tasks. For example, a server system, e.g., JBoss, Weblogic, can run threads to service programs of different applications within the server system. Additionally, although a single thread evaluates a program, additional threads can be initiated to run other programs. For example, multiple threads can be evaluated simultaneously, e.g., four CPU cores running four threads simultaneously on each CPU core.

As discussed herein, a "parse tree representation" refers to a representation of the syntactic structure of a string according to some context-free grammar. The parse tree representation can be used to represent the evaluation of elements within an expression represented by the string. The parse tree representation can be a rooted tree that includes multiple nodes that are assigned to individual elements of the expression. The multiple nodes include a "root node" and multiple "intermediate nodes." A "root node" represents a node at the highest level of the syntactic structure of the rooted tree, whereas "intermediate nodes" represent all other nodes besides the root node within tree. The tree can have multiple hierarchal levels based on the arrangement of intermediate nodes that descend from the root node. For instance, a particular intermediate node can be associated with multiple descending intermediate nodes that each represent a "child node" of the particular intermediate node. The particular intermediate node can therefore represent a "parent node" of the descending intermediate nodes. Examples of parse tree representations of expressions are discussed below with reference to FIGS. 4 and 5.

Additionally, a single parse tree representation can represent the syntactic structure of a single expression, or alternatively, the syntactic structure of multiple expressions. For example, if the expression to be evaluated is a simple expression with three elements, then a single parse tree representation can be used to represent the simple expression. In another example, if the expression to be evaluated is a complex expression with nested expressions that are each to be evaluated, then a single parse tree representation can represent the structure of the complex expression, and a subset of the parse tree representation, e.g., individual branches with child nodes, can represent an individual nested expression. In this regard, the structure of the parse tree representation can be accommodated and structured based on the complexity of the expression that it represents.

FIG. 1 illustrates an example of a system 100 that is capable of evaluating elements of an expression on multiple processor threads. The system 100 can include a developer system 110 for developing a baseline expression 120A, a server 140 for processing the baseline expression 120A and generating a parallelized expression 120B, and client systems 160A-N that provide output to end-users based on the evaluation of the baseline expression 120A and/or the parallelized expression 120B. The developer system 110 can be a portable computing device, e.g., a laptop, a tablet, a smartphone, etc., or a non-portable computing device, e.g., a desktop computer.

The system 100 is capable of parallelizing the baseline expression 120A to generate the parallelized expression 120B. In general, the transformed expression 120A represents a parallelized form of the baseline expression 120B. For example, evaluation of the baseline expression 120A and the parallelized expression 1206 can return the same intended value. A parallelized expression, as discussed throughout this document, refers to an expression that includes one or more elements that are evaluated in parallel during the evaluation of the expression. For example, two elements of the expression can be evaluated on two different CPU threads, e.g., as two separate processes, as opposed to being evaluated sequentially on the same CPU thread.

The parallelized expression 120B can be evaluated to generally provide the same output as the evaluation of the baseline expression 120A. In this respect, evaluation of the parallelized expression 120B by, for example, the server 140, can substitute the evaluation of the baseline expression 120A. In some implementations, the parallelized expression 120B represents a modified string or text of the baseline expression 120A that includes additional parallelization code that modifies the evaluation of the expression specified by the modified string. For example, the baseline expression 120A can be include two functions "callWebService1( )" and "callWebService2( ):

"{10,callWebService1( ),20,callWebService2( ),30}"

The parallelized expression 120B, in this example, can be restructured to add a third function, "parallel( )" that evaluates the two functions specified within of the baseline expression 120A in two threads:

{10,parallel(callWebService1( )),20,parallel(callWebService2( )),30}

Another example of the parallelized expression 120B is as follows:

```
class List {
    eval(ParseTree[] parseTrees) {
        for(ParseTree parseTree:parse Trees) {
            if(parseTree.isParallelCandidate( )) {
            parseTree.startInParallel( );
            } else {
                parseTree.startInSerial();
            }
        }
    }
}
```

In the example above, the bolded portion of the expression is inserted into the baseline expression 120A to generate the parallelized expression 120B (including the bolded portion). In this example, the inclusion of the bolded portion causes elements of the expression that are identified as parallel candidates to be evaluated in a parallel thread, whereas elements of the expression that are not identified as parallel candidates to be evaluated in a serial thread.

The time required to evaluate the parallelized expression 120B can be reduced relative to the time required to evaluate the baseline expression 120A due to the parallelized evaluation of elements. For example, the evaluation of the baseline expression 120A can require sequential evaluation of four computationally independent operations that each take one second to complete, which results in a total evaluation time of four seconds. In contrast, because the four operations are computationally independent, the parallelized expression 120B can require parallel evaluation of three of the four operations, which are evaluated simultaneously, followed by evaluation of the fourth operation. The total evaluation time of the parallelized expression 120B is two seconds (one second for evaluating the three parallel operations and one second for evaluating the fourth operation).

The expressions 120A and 120B can generally be declarative code that is evaluated to return a value. As discussed above, an expression can be a combination of explicit values, constants, variables, operators, and functions that is evaluated to return a value and/or perform an action, such as producing a graphical user interface (GUI). For example, the expressions 120A and 120B can include declarations that define arithmetic operations, functions to be evaluated, or parameters to be accessed, when evaluating the baseline expression 120A on a CPU thread. Other examples of expressions are depicted in FIGS. 3A-B, 4, and 5, and discussed in greater detail below.

The expressions 120A and 120B can be coded in declarative programming language. For example, the expressions 120A and 120B can be structured data in the form of extensible markup language (XML). In other instances, the expressions 120A and 120B can alternatively be coded in imperative programming language. For example, the expressions 120A and 120B can be structured data in the form of JavaScript or Java. The expressions 120A and 120B can include declarative use of functions that are provided by a library of functions. For example, function named "SUM" may be defined in a library of functions using imperative code, which is referenced as declarative programming language in the expressions 120A and 120B. In this regard, the expressions 120A and 120B can be provided based on declarative input provided by a developer that is not aware of the imperative coding on which the expressions 120A and 120B may rely. The software developer may simply identify a function for use in the expressions 120A and 120B when coding the expressions 120A and 120B without regard to the imperative code corresponding to the function that may be subsequently identified and evaluated during evaluation of the expressions 120A and 120B.

Referring now to the components of the system 100, the developer system 110 can include a developer application 112 that is used by a developer, e.g., a software developer, to develop the baseline expression 120A. For example, the developer application 112 can be an integrated development environment (IDE) that enables a user to create, modify, and test the baseline expression 120A. The developer application 112 can enable the developer to develop the baseline expression 120A using text. For example, developer application 112 can display the baseline expression 120A in text to the developer and enable the developer to modify the text.

In some implementations, the developer application 112 enables the developer to develop the baseline expression 120 graphically. For example, the developer application 112 can graphically represent portions of the baseline expression 120A, enable users to interact with the graphical representations, and generate text or a structured representation representing code for the baseline expression 120A based on the user's interactions with the graphical representations.

The developer application 112 can enable a developer to provide the baseline expression 120A to a server 140. For example, once the developer finishes developing a baseline expression 120A, the developer may instruct the developer application 112 to deploy the baseline expression 120A to the server 140. The developer application 112 can then transmit the baseline expression 120A to the server 140 over a network 130, e.g., an intranet or the Internet. The baseline expression 120A can be processed by the server 140 using the techniques discussed throughout to generate the transformed expression 120B, which is then provided to the client applications 162A-N, or alternatively, executed by the server 140.

The developer application 112 can generally be used by the developer to perform various types of operations in association with the client applications 162A-N. In some implementations, the developer application 112 permits a developer to develop code that is executed by the client applications 162A-N to provide functionalities, e.g., business process management tools relating to data stored in the information database 144. In such implementations, the code to be executed by the client applications 162A-N can include the transformed expression 120B to improve local execution of the code by the client systems 160A-N. Alternatively, or in addition, in some implementations, the developer application 112 permits the developer to develop code to be executed by the server 140, e.g., code relating to application services hosted by the server 140 in association with the client applications 162A-N. In such implementations, the code to be executed by the server 140 can include the transformed expression 120B to improve execution of the code by the server 140. In this regard, techniques discussed herein can be applied to any type of declarative code that is executed in relation to the client applications 162A-N. For example, the baseline and transformed expressions 120A and 120B can be part of the code of the developer application 112, code run by the server 140, and/or the client applications 162A-N.

The server 140 can include an expression module 142 that is used to process and parallelize the baseline expression 120A to generate the parallelized expression 120B. The expression module 142 can receive the baseline expression 120A from the developer system 110 and store the received baseline expression 120A in an expression database 146. The expression module 142 can retrieve the baseline expression 120A from the expression database 146 when needed, e.g., prior to parallelizing the baseline expression 120A to generate the parallelized expression 120B.

The expression module 142 can generate the parallelized expression 120B based on parallelization code stored within an information database 144. For example, the information database 144 can store parallelization functions that the expression module 142 retrieves and places into text of the baseline expression 120A to generate the parallelized expression 120B. The evaluation of the parallelized expression 120B causes the evaluation of the parallel functions so that one or more computationally independent elements of the parallelized expression 1206 (or the baseline expression 120A) are evaluated on different threads. As an example, the expression module 142 inserts a parallelization functions "startInParallel( )" and "isParallelCandidate( )" into the text of the baseline expression 120A so that the text for the parallelized expression 120B would result be as follows:

```
class List {
    eval(ParseTree[] parseTrees) {
        for(ParseTree parseTree:parse Trees) {
            if(parseTree.isParallelCandidate( )) {
                parseTree.startInParallel( );
            } else {
                parseTree.startInSerial();
            }
        }
    }
}
```

In this example, the parallelization functions "startInParallel( )" and "isParallelCandidate( )" are each associated with a class of functions "parseTree" that are stored in the information database 144. More detailed descriptions of the functions performed by the expression module 142 are discussed below in reference to FIG. 2.

The client systems 160A-N can be portable computing devices, e.g., laptops, tablets, phones, etc., or non-portable computing devices, e.g., a desktop computer. While the example depicted in FIG. 1 depicts the system 100 with four client systems 160A-N, in other implementations, the system 100 can have more or less than four client systems that are configured to exchange communications over the network 130. For example, the system 100 may include one client system or a hundred client systems. The client systems 160A-N can include displays, e.g., liquid crystal displays (LCDs), that display information, and may be configured to receive input from users in response to the users using input devices (e.g., touch screens, touch pads, mice, or keyboards) to interact with interfaces presented for output on the displays.

The client systems 160A-N can run on different software platforms. As shown, the first client system 160A runs a mobile platform A, e.g., an iOS operating system, the second client system 160B runs a mobile platform B, e.g., an Android operating system, the third client system 160C runs a web browser platform, e.g., Internet Explorer, and the fourth client system 160N runs an unspecified platform that is different from the software platforms 162A-C, e.g., platform N.

While the client systems 160A-N are all shown with different platforms, some or all of the client systems 160A-N may use the same type of platform. For example, the first client system 160A and the second client system 160B can both use mobile platform A or all the client systems 160A-N may use the web browser platform. In some implementations, a single client system may include multiple types of platforms. For example, the same desktop computer may be booted to load the Windows operating system or the Linux operating system.

The client systems 160A-N can run software, such as a dedicated application or a web-based application, that allows the client systems 160A-N to access services hosted and/or run on the server 140. For example, the client system 160A runs a client application 162A, e.g., a mobile application running on the iOS operating system, the second client system 160B runs a client application 162B, e.g., a mobile application running on the Android operating system, the third client system 160C runs a client application 162C, e.g., a web-based application running on a desktop operating system, and the fourth client system 160D runs a client application 162N in an unspecified manner. In one particular implementation, the client applications 162A-N are business process management software that enables the client systems 160A-N to access services, toolkits, or other functionalities that are made available by the server 140 over the network 130.

Figure 2:
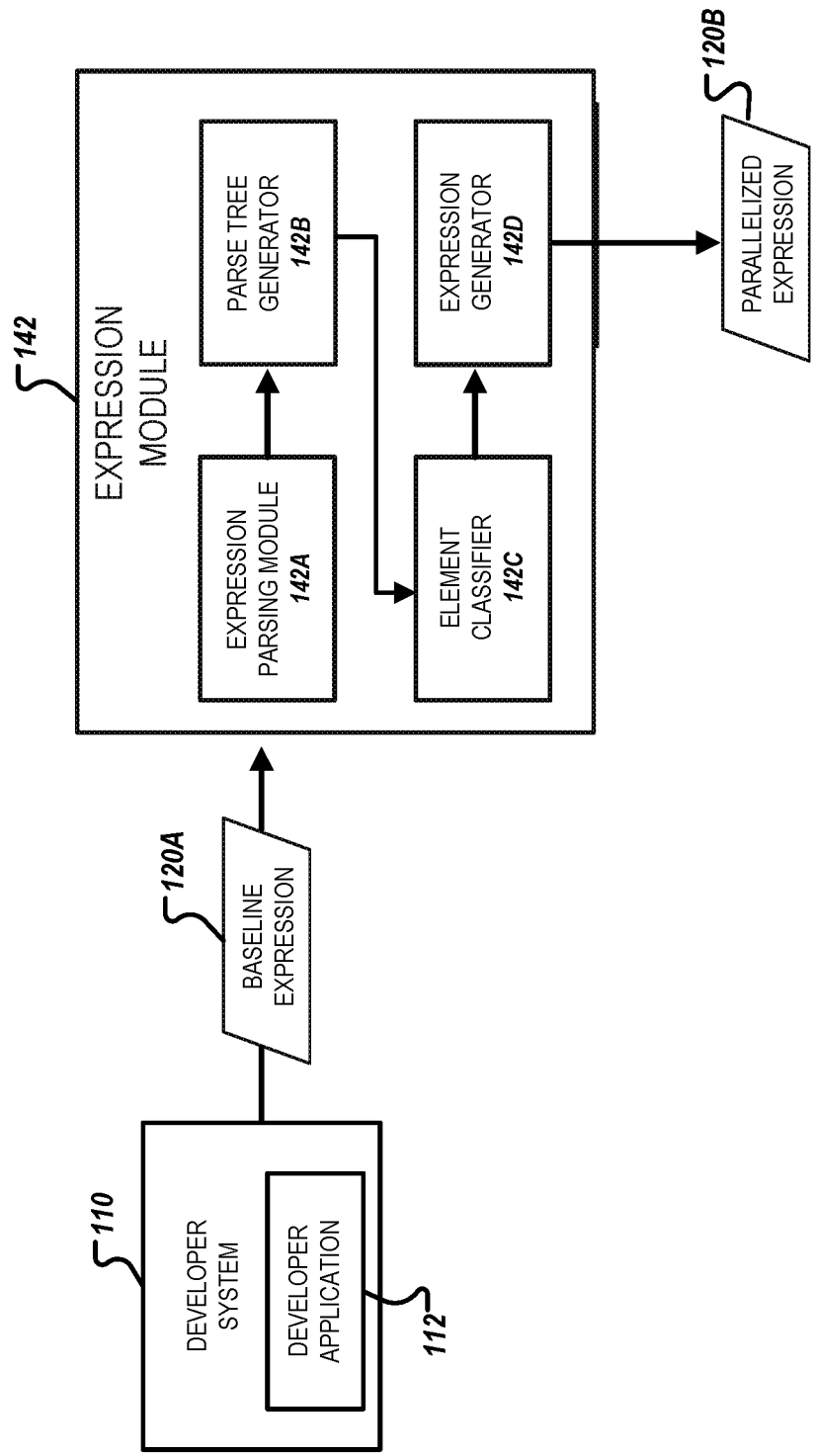
FIG. 2 illustrates an example of an expression module that is capable of constructing and transforming an expression.

FIG. 2 illustrates an example of an expression module 142 that is capable of constructing and transforming a baseline expression 142 into a parallelized expression 120B. The expression module 142 further includes an expression parsing module 142A, a parse tree generator 142B, an element classifier 142C, and an expression generator 142C. The expression module 142 can represent a software module that runs on a server system, such as the server 140 depicted in FIG. 1.

In general, the expression module 142 processes the baseline expression 120A as input and provides the parallelized expression 120B as output. In the example depicted in FIG. 2, the baseline expression 120A is received from the developer system 110 running the developer application 112. For example, the baseline expression 120A can represent a text segment (or string) that is generated based on input of a developer received on the developer application 12. As discussed above, in some implementations, the developer application 112 can represent software that a user accesses to define business rules and logic for business process management.

In the example depicted in FIG. 2, the expression parsing module 142 processes a text segment of the baseline expression 120A to identify elements of the expression. Expression elements include explicit values, constants, variables, operators, and/or functions that a programming language interprets and computes to produce (or "return" in a "stateful" environment) another value that represents the output of the expression. To accomplish this, the expression parsing module 142A can use various types of recognition techniques to identify individual elements of an expression. For example, the expression parsing module 142A can access stored programming language libraries, e.g., in the information database 144, to identify character strings or text segments that represent elements of the baseline expression 120A.

Figure 4:
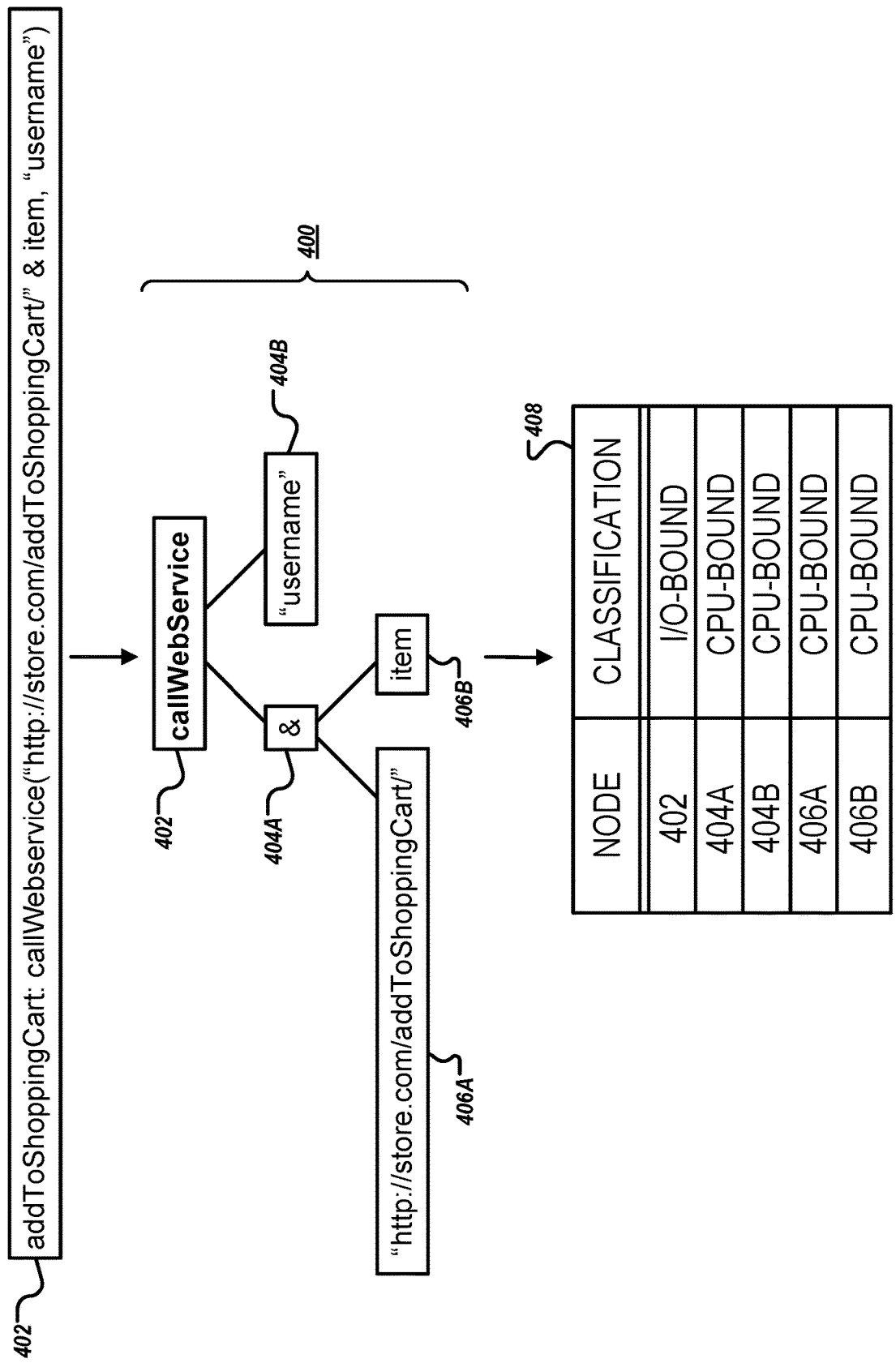
FIG. 4 illustrates an example of technique for generating a parse tree representation of an expression.
Figure 5:
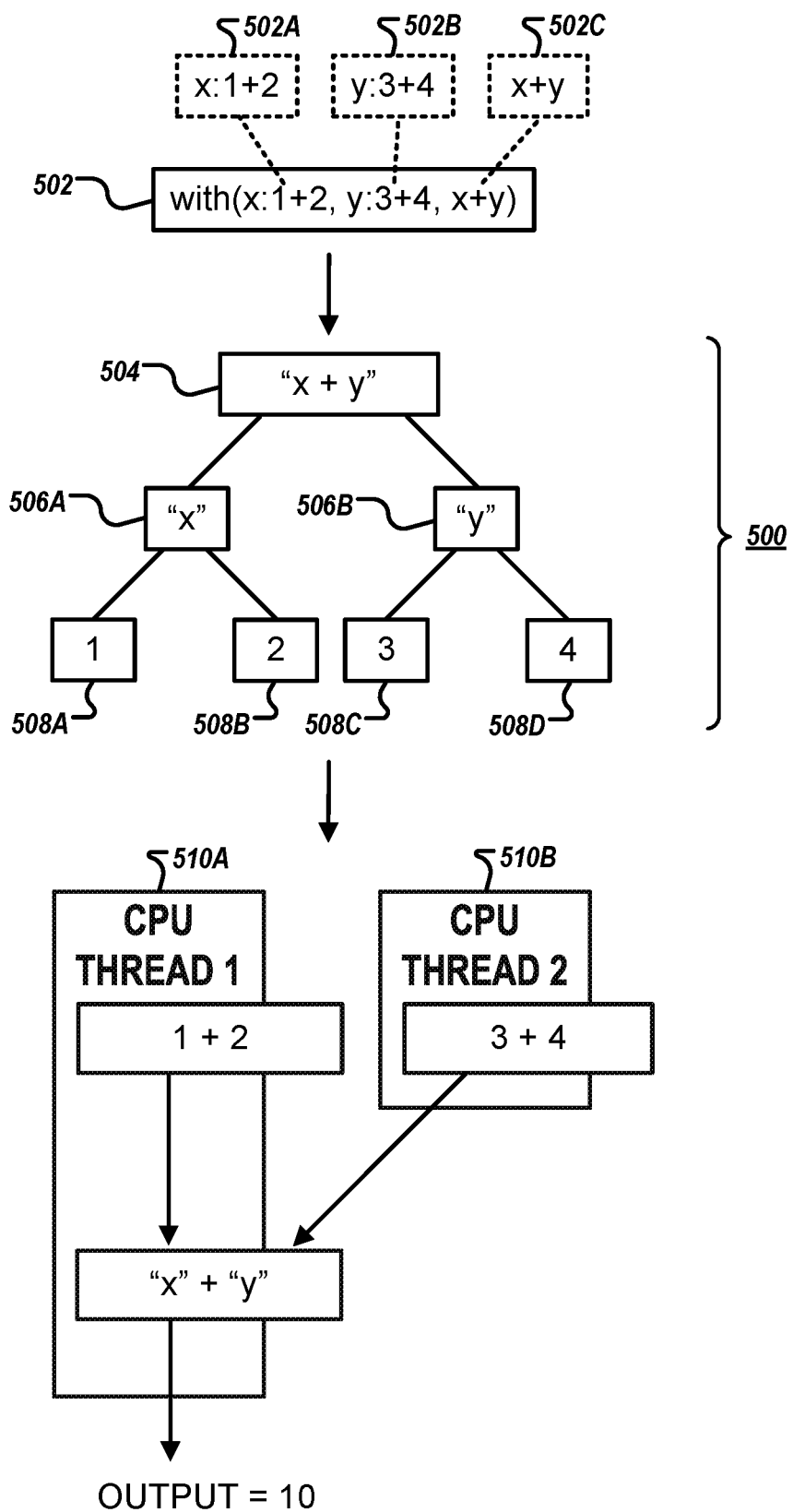
FIG. 5 illustrates an example of a technique for evaluating computationally dependent elements of an expression.

The parse tree generator 142B groups the expression elements identified by the expression parsing module 142A into a parse tree representation of the baseline expression 120A. Examples of parse tree representations are depicted in FIGS. 4 and 5 and discussed in greater detail below.

The parse tree representation indicates a syntactic structure of the baseline expression 120A based on a particular order for evaluating elements when evaluating the overall expression. For example, elements that are computationally dependent on other elements of the baseline expression 120A are placed in a higher level of the syntactic structure. As an example, the expression "function((x+y), z)" has elements that include a function, e.g., "function( )" an arithmetic operation, e.g., "(x+y)," and three parameters, e.g., "x," "y," and "z". In this example, evaluation of the function and the arithmetic operation are computationally dependent on the parameters, and therefore, these elements are placed in a higher level of the parse tree representation for the baseline expression 120A. Additionally, because the function is also computationally dependent on the arithmetic operation, the function is further placed in a higher level compared to the arithmetic operation.

The parse tree representation includes multiple nodes that are each assigned to an element identified by the expression parsing module 142A. The nodes of the parse tree representation include a root node and multiple intermediate nodes that descend from the root node within the parse tree representation. For example, when generating a parse tree representation for the expression "function((x+y), z)," the parse tree generator 142B assigns "function( )" to the root node assigns "(x+y)," "x," "y," and "z" each to intermediate nodes that descend from the root node. In this example, the function element is assigned to the root node since its evaluation is computationally dependent on the other elements of the expression. The elements "(x+y)" and "z" are assigned to intermediate nodes that descend directly from the root node since their respective evaluation is not computationally dependent on one another (i.e., "x," "y," and "z" are each independent parameters). Additionally, the elements "x" and "y" are assigned to intermediate nodes that are descend from the intermediate node assigned to the element "(x+y)." In this example, intermediate nodes assigned to elements "x" and "y" are child nodes to the intermediate node assigned to the element "(x+y)."

The element classifier 142C classifies each element within the parse tree representation as generally representing either an element that is a candidate for parallelization or an element that is not a candidate that is eligible for parallelization. This classification can be based on attributes of each individual element that impact the evaluation of an expression.

For example, elements that are determined to have high processing and/or resource requirements for evaluation, e.g., a processing requirement that satisfies a predetermined threshold, can be classified as being candidates for parallelization. In this example, parallelization of the expression would result in high-resource elements being evaluated in a separate thread to improve performance while evaluating the expression. As another example, elements that have a high evaluation time, e.g., an evaluation time exceeding a threshold time, can be classified as being candidates for parallelization. In this example, parallelization of the expression would result in an overall reduction in the time required to evaluate the parallelized expression relative to the baseline (or un-parallelized) expression. In yet another example, elements that associated certain security requirements, e.g., user authentication, data verification, etc., can be classified as being candidates for parallelization. In this example, parallelization of the expression can be used improve security when evaluating the expression.

In some implementations, the element classifier 142C can classify each element based on whether the element represents an input/output-bound (I/O-bound) function or a CPU-bound function. An I/O-bound function can represent a function that interoperates, or is computationally dependent on, a component that operates outside the local operating system processes of a computing device that evaluates the expression. For example, an I/O-bound function can refer to a function that reads results from a file, queries a relational database management system (RDMS), or calls a remote web service. A CPU-bound function can represent a function that is not computationally dependent on a component operating outside the local operating system processes (i.e., a function that only use internal operating system resources). For example, a CPU-bound function refer to a function that retrieves a stored username.

A simplified example of classification performed by the element classifier 142C is for a function "addToShoppingCart," which adds items selected by a user to an online shopping cart. The expression can be represented as follows:

```
callWebservice("http://store.com/addToShoppingCartr
   & item,"username")
```

In this example, the element classifier 142C classifies the function "addToShoppingCart" as an I/O-function because its evaluation requires accessing a web server associated with the URL "http://store.com/addToShoppingCart/," checking if an item represented by the parameter "item" is available for purchase, and then update the shopping cart for the user identified by the "username."

The expression generator 142C generates the parallelized expression 120B for the baseline expression 120A based on the classifications performed by the element classifier 142C and the parse tree generated for the baseline expression 120A. In some implementations, the expression generator 142C inserts parallelization code into the text of the baseline expression 1206 to generate the parallelized expression 1206. In such implementations, the inserted parallelization code can include parallelization functions that cause elements that are classified as representing candidates for parallelization to be evaluated in a different thread than the thread used to evaluate elements that are classified as note representing candidates for parallelization.

In other implementations, the expression generator 142C generates a text segment for a new expression that represents the parallelized expression 120B. In such implementations, the elements of the baseline expression 120A are re-organized and/or re-structured in the parallelized expression to permit parallelized expression of elements that are classified as representing candidates for parallelization. For example, the expression generator 142C can generate a new expression based on the syntactic structure specified by the parse tree of the baseline expression 120A. In this example, the original order specified by the baseline expression 120A for evaluating expression elements can be modified in the parallelized expression 120B although the output of its evaluation is identical or substantially similar to the output of evaluating the baseline expression 120A, e.g., producing the same value, constant, or variable.

In some implementations, the precise manner in which the expression generator 142C generates the parallelized expression 120B, e.g., by inserting parallelization code into the baseline expression 120A or generating a new expression for elements of the baseline expression 120A, is dynamically adjusted based on the contents of the baseline expression 120A.

For example, the expression generator 142C can generate the parallelized expression 120B by inserting parallelization code into the text of the baseline expression 120A if the number of elements that are classified as representing candidates for parallelization does not satisfy a threshold number. Alternatively, the expression generator 142C can generate the parallelized expression 120B by generating a new expression if the number of elements that are classified as representing candidates for parallelization satisfies a threshold number. In this example, the expression generator 142C uses the threshold to determine whether a processing requirement for generating the parallelized expression and a potential processing reduction that results from evaluating the parallelized expression 120B relative to evaluating the baseline expression 120A. In this example, if the processing requirement to generate a new expression exceeds the potential processing reduction of the new expression, the expression generator 142C may opt to insert parallelization code into the text of the baseline query. Alternatively, if the processing requirement is less than the potential processing reduction, then the expression generator 142C may opt instead to generate a new expression. Another example of a technique used by the expression generator 142C to determine the technique to generate the parallelized expression 120B include evaluating the time required to generate a new expression versus the potential reduction in time for evaluating the new expression relative to evaluating the baseline expression 120A.

FIG. 3A illustrates an example of evaluating an unparallelized expression 302. In the example depicted, the expression 302 includes four functions:

"item1:addToShoppingCart("chocolate")"  (1)

"item2:addToShoppingCart("marshmallows")"  (2)

"item3:addToShoppingCart("graham crackers")"  (3)

"order({item1,item2,item3})"  (4)

The four functions are sequentially evaluated during the evaluation of the expression 302 on a single thread 310 of a processor or a processor core. In this example, the first three functions involve adding items to a shopping cart of a user by evaluating the "addToShoppingCart( )" function for items "chocolate," "marshmallows," and "graham cracker," which are represented by parameters "item1," "item2," and "item3," respectively. The fourth function involves ordering items represented by the parameters of the first three functions, e.g., "item1," "item2," and "item3," by evaluating the "order( )" function for the parameters. Because the functions are performed sequentially, the evaluation time of the expression 302 is roughly equal to the total time required to evaluate the four functions, e.g., four second evaluation time if each function takes one second to evaluate.

FIG. 3B illustrates an example of evaluating a parallelized expression 304. In the example depicted, the expression 304 includes the four functions that are included in the expression 302, as well as three additional functions "startNewThread( )" that invoke its arguments in a separate thread of a processor or a processor core. In this example, the first three functions of the expression 304 are evaluated on threads 320A, 320B, and 320C, respectively. The fourth function of the expression 304 is evaluated in a thread 320D, or alternatively, on one of the threads 320A-C. Compared to the evaluation of the expression 302, the evaluation of the expression 304 has a shorter total evaluation time because the first three functions can be evaluated substantially simultaneously in parallel on separate threads, e.g., two second evaluation time if each function takes one second to evaluate. In this example, the first three functions of the expression 304 can be performed simultaneously and on different threads because they are not computationally dependent on one another (i.e., evaluation of each function is based on independent arguments).

Evaluation of the expressions 302 and 304 each result in the same output, e.g., output of the evaluating function "order({item1, item2, item3})." As discussed above, the evaluation of the expression 304 potentially takes half the amount of time compared to the evaluation of expression 302, e.g., two-second evaluation vs. four-second evaluation. If performed manually by a developer (i.e., without techniques discussed herein), generating the expression 304 may require a developer to modify expression 302 to add "startNewThread( )" functions as shown in FIG. 3B. For example, the developer may need to determine the best locations to insert the "startNewThread( )" functions, and can possibly insert the functions at an incorrect location, e.g., around the "order( )" function, which would not improve evaluation. As such, the parallelization technique described in detail below with respect to FIG. 6, can be used to automate the parallelization of expression without developer input.

FIG. 4 illustrates an example of technique for generating a parse tree representation 400 of an expression 402 to be parallelized. In this example, the parse tree representation 400 indicates a hierarchal structure of nodes that are assigned to elements of the expression 402. For example, the function "callWebService" is assigned to a node 402, the operator "&" is assigned to a node 404A, the variable "username" is assigned to a node 404B, the URL ""http://store.com/addToShoppingCartr is assigned to a node 406A, and the object "item" is assigned to a node 406b.

In general, the techniques discussed below in reference to FIG. 4 are performed automatically (i.e., without human intervention). To accomplish this, a computer system, such as the server 140, is capable of identifying elements of the expression 402, classifying each of the identified elements, and assigning the elements to specific nodes within the parse tree representation 400. In this regard, the generation of the parse tree representation 400 and the generation of the transformed expression using the parse tree representation 400 can be performed automatically without human intervention. An example of a process for automatically generating a transformed expression is discussed below in reference to FIG. 6.

In some implementations, the generation of the parse tree representation 400 and/or generation of the transformed expression based on the baseline expression can be augmented based on user input. For example, the server 140 may initially generate the parse tree representation automatically, and a developer can have an opportunity to modify the parse tree representation, e.g., adjusting the assignment of elements to nodes, adjusting the structure of the parse tree representation, etc. In another example, the developer can have the opportunity to modify a transformed expression that is automatically generated by the server 140. In some instances, the server 140 can provide the developer with the ability to approve and/or disapprove of a transformed expression prior evaluation. For example, once the server 140 has generated the transformed expression, the server 140 may only evaluate the transformed expression once the developer has approved its use.

In the example depicted in FIG. 4, the arrangement of nodes within the parse tree representation 400 represents a particular order in which elements of the expression 402 are to be evaluated during the evaluation of the expression 402. For example, the evaluation of the function "callWebService" involves accessing two parameters, e.g., accessing "username" and accessing a specified item on a URL. While accessing "username" involves a single variable, accessing the specified item on the URL involves two variables, e.g., the URL assigned to node 406A and "item" assigned to node 406B. The parse tree representation 400 indicates that the element assigned to node 404A is computationally dependent on elements assigned to nodes 406A and 406B, that the element assigned to node 404A is not computationally dependent to the element assigned to node 404B, and that the element assigned to the node 402 is computationally dependent on both of the elements assigned to nodes 404A and 404B.

In the example depicted, node 402 represents the root node of the parse tree representation 400, and nodes 404A-B, 406A-B represent intermediate nodes of the parse tree representation 400. Additionally, the node 402 is a parent node to nodes 404A and 404B (i.e., the node 402 is placed in a hierarchal level within the parse tree representation 400 preceding a hierarchal level of the nodes 404A and 404B within the parse tree representation 400). In the same regard, the nodes 404A-404B are child nodes to node 402.

As discussed in greater detail below, the relationship between parent and child nodes within a parse tree representation are used to identify computational dependencies between individual elements of an expression, which is used to classify elements as representing either elements that are eligible for parallelization or elements that are not eligible for parallelization.

Table 408 identifies classifications of elements assigned to each of the nodes 402, 404A, 404B, 406A, and 406B. As shown, the element assigned to node 402 is classified as an "I/O-bound function" that is a candidate for parallelization, whereas nodes 404A-B, 406A-B are each classified as a "CPU-bound function" that are not candidates for parallelization. As discussed herein, a I/O-bound function refers to a function whose evaluation interoperates with a component outside an immediate operating system process, and a CPU-bound function refers to a function whose evaluation relies only on the immediate operate system process. For example, an I/O-bound function can be a function that reads results from a file, queries a relational database management system (RDBMS), or access a remote web service.

As depicted in FIG. 4, the element assigned to the node 402 is eligible for parallelization because its evaluation requires accessing a remote web server, which can be performed on a separate thread than the thread used for evaluating the other elements of the expression 400, which are evaluated using local resources only.

FIG. 5 illustrates an example of a technique for evaluating computationally dependent elements 502A, 502B, and 502C of an expression 502. As discussed above, a parse tree representation 500 is initially generated to represent the structure of the expression 502. In this example, each of the elements 502A, 502B, and 502C is represented as an individual parse tree within the parse tree representation. For example, the element 502A is represented as a parse tree defined by nodes 506A, 508A, and 508B. The element 502B is represented as a parse tree defined by nodes 506B, 508C, and 508D. The element 502D is defined is represented as a parse tree defined by nodes 504, 506A, and 506B (of which, nodes 506A and 506B each have child nodes).

The parse tree representation 500 is an example of a split point that has been instrumented to support automatically supporting a new thread for parallelization. A split point typically has two or more child parse trees, e.g., individual parse trees for elements 502A, 502B, and 502C within the parse tree representation 500. If two or more of these child trees are eligible for parallelization, then can be grouped with non-eligible parse trees to create batches of parse trees that can be evaluated in threads. For example, one batch of parse trees can be evaluated in a primary thread (i.e., a thread that is already running), and another batch of parse trees can be evaluated on a non-primary thread (i.e., a newly created thread that is configured to run in parallel with the primary thread). If two or more parse trees (or two or more elements represented by the parse trees) are determined to be eligible for parallelization, then a new thread can be started to permit parallel evaluation of the parse trees. In this regard, any split point is eligible for multi-threading and marked as such to its caller. Split points can be nested within split points either directly (one immediate level) or indirectly (via multiple levels of parse trees).

In the example depicted in FIG. 5, the parse tree representation 500 generally represents a "variable definition" split point. With this type of split point, a list of variables are used to define a context and expression to run, which can be represented as "with(var$_1$:element$_1$, var$_2$:element$_2$, . . . expressionInVariableContext)" for transient data or "var$_1$: element$_1$, var$_2$:element$_2$, . . . expressionInVariableContext)" for persistent data.

As shown in FIG. 5, the expression 502 is defined by variables "x," y," and "x+y," which are each defined by numerical elements. When the expression 502 is evaluated, an intermediate result of "with(x:3, y:7, x+y)" would result before the final result of "10." If performed sequentially on a single thread, three operations would be performed, e.g., evaluating "x," followed by evaluating "y," followed by evaluating "x+y." However, the evaluation of "x" is not dependent on the evaluation of "y" (i.e., the value of "x" is not necessary to evaluate the value of "y" and vice versa), and therefore elements 502A and 502B are not computationally dependent on one another. Additionally, because the values of "x" and "y" are both necessary for evaluating "x+y," element 502C is computationally dependent on both elements 502A and 502B.

When evaluating the expression 502, the system classifies elements 502A and 502B as representing elements that are eligible for parallelization because their respective evaluations are independent of one another. For example, computation of parameters "x" and "y" in elements 502A and 502B are only dependent on numerical values. In contrast, evaluation of element 502C is dependent on both elements 502A and 502B because it references parameters "x" and "y," which are computed based on the evaluation of elements 502A and 502B, respectively.

Elements 502A and 502B can therefore be evaluated in parallel in two different threads 510A and 510б. In this example, thread 510A can represent a primary (or current) thread and thread 510б can represent a non-primary (or new) thread that the system initiates based on the classifications of elements 502A and 502B. Elements 502A and 502B can be evaluated substantially simultaneously in parallel and then when the element 502C is evaluated, the value computed in the thread 510б is referenced to generate the final output. If the evaluation of each element requires one second processing time, then sequentially evaluating the expression 502 would require three seconds, whereas evaluating the expression 502 based on evaluating elements 502A and 502B in parallel, as shown in FIG. 5, would require two seconds.

Although FIG. 5 illustrates an example of evaluating an expression using two parallel threads, e.g., threads 510A and 510б, the system can be capable of using similar techniques to utilize greater than two threads. For example, if an expression requires evaluation of three elements that are not computationally dependent, then the system may start two non-primary threads (i.e., two new threads) when evaluating a first element on the primary (or current) thread. In this example, the expression could be evaluated using three parallel threads to evaluate each of the three elements substantially simultaneously in parallel.

In some implementations, system is capable of performing similar automatic parallelization techniques as depicted in FIG. 5 to other types of split points. In such implementations, the system performs the techniques automatically based on using, for example, text processing techniques to automatically identify elements that are present within a text segment for the expression. For example, the server 140 can access a lookup table of elements stored within the expression database 146 and identify an element within an expression based on determining that text identified in the text segment of the expression matches an element identified within the lookup table.

In one example, the system is capable of using parallelization techniques to evaluate an expression that is a "list" split point. A list split point can be expressed as:

"{element$_1$,element$_2$,element$_n$}"

An example of an expression that is a list split point is as follows:

{1+2,3+4,5+6}

After this evaluating this expression, the result yielded by the system would be "{3, 7, 11}." In this example, each element, e.g., "1+2," "3+4," "5+6," is a parse tree to evaluate. The evaluation of elements does not interfere with one another during evaluation of the expression so the system would classify each of the elements as being eligible for parallelization. In this example, the system may start two new threads to evaluate each of the three elements substantially simultaneously in parallel in three different threads.

In another example, the system is capable of using parallelization techniques to evaluate an expression that is a "dictionary" split point. A dictionary split point can be expressed as:

"{a:element$_1$,b:element$_2$,z:element$_n$}"

An example of an expression that is a dictionary split point is as follows:

{a:1+2,b:3+4,c"5+6}

After this evaluating this expression, the result yielded by the system would be "{a:3, b:7, c:11}." In this example, each element, e.g., "a," "b," "c," is a parse tree to evaluate. The evaluation of elements does not interfere with one another during evaluation of the expression so the system would classify each of the elements as being eligible for parallelization. In this example, the system may start two new threads to evaluate each of the three elements substantially simultaneously in parallel in three different threads.

In another example, the system is capable of using parallelization techniques to evaluate an expression that is a "function parameters" split point. A function parameters split point can be expressed as:

"function(element$_1$,element$_2$, . . . ,element$_n$)"

An example of an expression that is a dictionary split point is as follows:

sum(1+2,3+4,5+6)

When evaluating this expression, the intermediate result yielded by the system would be "sum(3,7,11)," and then the final result of "21." In this example, each element, e.g., "1+2," "3+4," "5+6," is a parse tree to evaluate. The evaluation of elements does not interfere with one another during evaluation of the expression so the system would classify each of the elements as being eligible for parallelization. In this example, the system may start two new threads to evaluate each of the three elements substantially simultaneously in parallel in three different threads.

In another example, the system is capable of using parallelization techniques to evaluate an expression that is a "error handling" split point. In this example, if the system encounters an error (or an exception) while evaluating any element on a new thread, then that error will be retained with the thread rather than propagated immediately, e.g., propagating the error as a result to another thread when evaluating another element that references a value of the element the evaluation of which produces an error. This allows the system to re-throw the first error that would have been thrown if multiple parse trees were to throw an error, thereby preserving the error behavior seen in a previous usage without multiple threads. This allows the system to provide an illusion during expression evaluation that there are no behavioral differences.

An example of an error handling split point can be expressed as:

"{10,error('a'),20,error('b'),30}"

Given that the "error('text')" function propagates an error exception to the caller immediately upon being evaluated in serial, when evaluating this expression, each element could be evaluated independently in separate threads. However, if this were done without handling the behavior, the system could evaluate "error('b')" before "error('a')" thus causing a difference in error behavior compared to the serial evaluation. To handle the error behavior, errors can be retained until all results or errors of preceding sibling parse trees have been evaluated. If a preceding sibling parse tree generated an error, then the error of the preceding sibling parse can be the one propagated. However, if all preceding sibling parse trees produced only non-error results, then the error would be propagated. This technique could be used to ensure that the "error('b')" can wait for "10," "error('a')" and "20" to be evaluated. Once "10" and "error('a')" are evaluated, "error ('a')" would be known to be the intended error and thus propagated and the "error('b')" ignored. The evaluation of the "30" is never required, as it is known that the "error('b')" would preempt its result.

Figure 6:
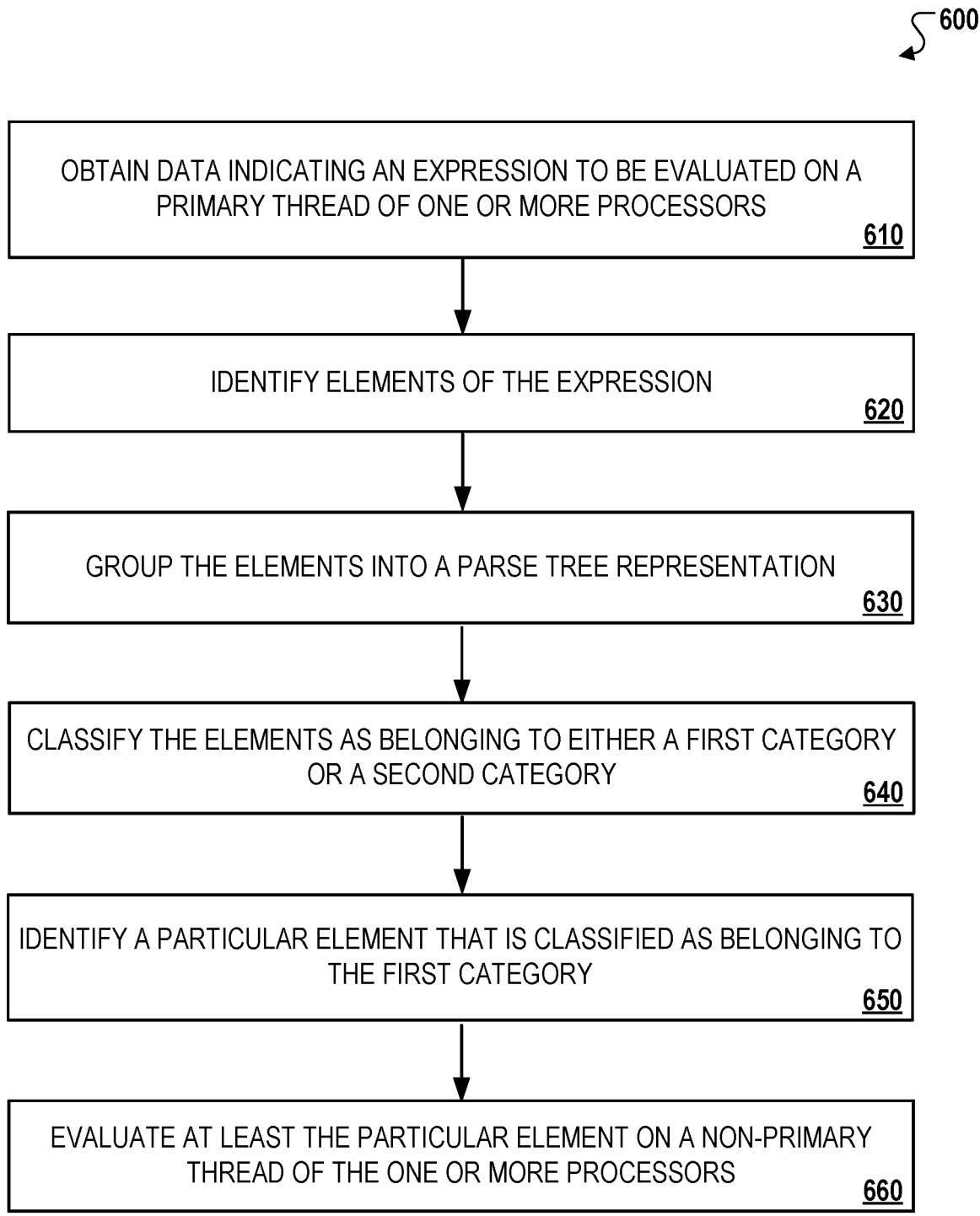
FIG. 6 illustrates an example of a process for evaluating elements of an expression on multiple threads of a processor.

FIG. 6 illustrates an example of a process 600 for evaluating elements of an expression on multiple processor threads. Briefly, the process 600 can include the operations of obtaining data indicating an expression to be evaluated on a primary thread of one or more processors (610), identifying elements of the expression (620), grouping the elements into a parse tree representation (630), classifying the elements as belonging to either a first category or a second category (640), identifying a particular element that is classified as belonging to the first category (650), and evaluating at least the particular element on a non-primary thread of the one or more processors (660).

In general, the process 600 is discussed below in reference to system 100, although any system can perform the operations of the process 600. The descriptions below reference the components of expression module 142 as performing the operation 600 for simplicity, although other components of the system 100 can additionally or alternatively perform the operations of the process 600. For example, in some implementations, the operations of the process 600 are performed by the developer application 112. In other implementations, the operations of the process 600 are performed by a combination of the developer application 112 and the expression module 142. For example, the developer application 112 may parse the text of the baseline expression 120A and identify elements of the expression 120A, whereas the expression module 142 may group the identified elements into a parse tree representation of the baseline expression 120A and then generate the parallelized expression 120B.

In more detail, the process 600 can include the operation of obtaining data indicating an expression to be evaluated on a primary thread of one or more processors (610). For example, the expression parsing module 142A can obtain data indicating the baseline expression 120A to be evaluated on one or more processors (a processor or a processor core). The baseline expression 120A can developed by a developer through the developer application 112A on the developer system 110 as discussed above with respect to FIGS. 1 and 2. Additionally, the baseline expression 120A can be any type of declarative code to be executed on the developer application 112, executed by the server 140, and/or executed by the client applications 162A-N.

The process 600 can include the operation of identifying elements of the expression (620). For example, the expression parsing module 142A can identify elements of the baseline expression 120A that are specified within the text segment. As discussed above, the identified elements can include explicit values, constants, variables, operators, and/ or functions that a programming language interprets and computes to produce (or "return" in a "stateful" environment) a value that represents the output of the baseline expression 120A. The expression parsing module 142A can identify the elements based on using text processing techniques. For example, the expression parsing module 142A can determine that text within a text segment for the baseline expression 120A corresponds to an element based on determining that the text matches text specified for the element within a lookup table stored in the expression database 146. The lookup table can specify a list of expressions with corresponding text within text segments for expressions.

The process 600 can include the operation of grouping the elements into a parse tree representation (630). For example, the parse tree generator 142B can group the elements into a parse tree representation, such as the parse tree representations 400 and 500 depicted in FIGS. 4 and 5. As discussed above, the parse tree representation includes a hierarchal structure of nodes that are assigned to the identified elements based on a particular sequence of evaluating the elements of the expression. For example, an element that is computationally dependent on two other elements, e.g., element "x+y" being dependent on the values of elements "x" and "y," is assigned to a particular node that is a parent node of the nodes assigned to the two other elements. In this example, the node assigned to element "x+y" would be a parent node of (and in a higher level of the hierarchy of the parse tree representation) than the nodes assigned to the elements "x" and "y."

As discussed above, the parse tree generator 142B generates a parse tree representation automatically (i.e., without human intervention). For example, the parse tree generator 142B identifies computational dependencies between elements identified within the baseline expression 120A, as discussed above for step 620. Elements that are computationally dependent on one another can be assigned to child nodes of a parent node (which then represents the dependency within the hierarchal structure of nodes).

The process 600 can include the operation of classifying the elements as belonging to either a first category or a second category (640). For example, the element classifier 142C can classify individual elements of the baseline expression 120A sequentially along the hierarchal structure of the nodes, e.g., from the lowest hierarchy level of the parse tree representation to the root node of the parse tree representation or vice versa. The element classifier 142C can classify each element as belonging to either a first category that includes elements that are eligible for parallel processing or a second category that includes elements that are not eligible for parallel processing. The classification can be based on different types of evaluating different types of classification criteria, evaluating the attributes of individual elements, evaluating relationships and/or computational dependencies to other elements, among others.

In one example, the element classifier 142C classifies an element as belonging to the first category if the element is a I/O-bound function, and classifies an element as belonging to the second category if the element is a CPU-bound function. As another example, the element classifier 142C classifies an element as belonging to the first category if a processing requirement for evaluating the element satisfies a predetermined threshold, and classifies an element as belonging to the second category if a processing requirement for evaluating the element does not satisfy the predetermined threshold. As discussed above, the classification of an element as being an I/O-bound function or a CPU-bound function can be based on accessing a lookup table stored in the expression database 146 that specifies predetermined classifications for different elements and/or functions.

In some instances, the classification of an element assigned to a particular node can be dependent on the classification of elements assigned to child nodes of the particular node. In such instances, if the element assigned to the parent node is classified as being eligible for processing, then both the element assigned to the particular node and the elements assigned to the child nodes of the particular node can be evaluated as a batch of elements in a new thread, as discussed above.

The process 600 can include the operation of identifying a particular element that is classified as belonging to the first category (650). For example, the element classifier 142C can determine that a particular element from among the elements identified within the baseline expression 120A is classified as belonging to the first category. In some implementations, the system identifies at least two or more elements that are classified as belonging to the first category when determining whether to initiate a new thread to initiate an automatic parallelization process as discussed above.

The process 600 can include the operation of evaluating at least the particular element on a non-primary thread of the one or more processors (660). For example, the expression generator 142D can generate the parallelized expression 120B, which when evaluated, results the particular element identified in step 650 being evaluated on a non-primary thread of the one or more processors (a processor or a processor core). As discussed above, the non-primary thread can represent a new thread that is initiated by the expression module 142 in response to determining that one or more elements of the baseline expression 120A are classified as belonging to the first category that is eligible for parallel processing. As discussed above, in some implementations, the expression module 142 can initiate more than one non-primary thread such that when the parallelized expression 120B is evaluated, elements of baseline expression 120A are evaluated simultaneously on a total of three or more threads. As discussed above, the primary and non-primary threads can run in parallel to permit substantially simultaneous evaluation of elements that are not computationally dependent on one another.

The parallelized expression 120B can be generated using different techniques. In some implementations, the expression generator 142C modifies the baseline expression 120A by adding parallelization code to the text segment of the baseline expression 120A that is obtained in step 610. In other implementations, the expression generator 142C reconstructs the baseline expression 120A to generate a new expression that different syntactic structure than the baseline expression 120B but using the same elements. In either example, the expression generator 142C generates the parallelized expression 1206 such that the output of evaluating the parallelized expression 120B is substantially similar to the output of evaluating the baseline expression 120A, e.g., producing the same value, constant, or variable.

Figure 7:
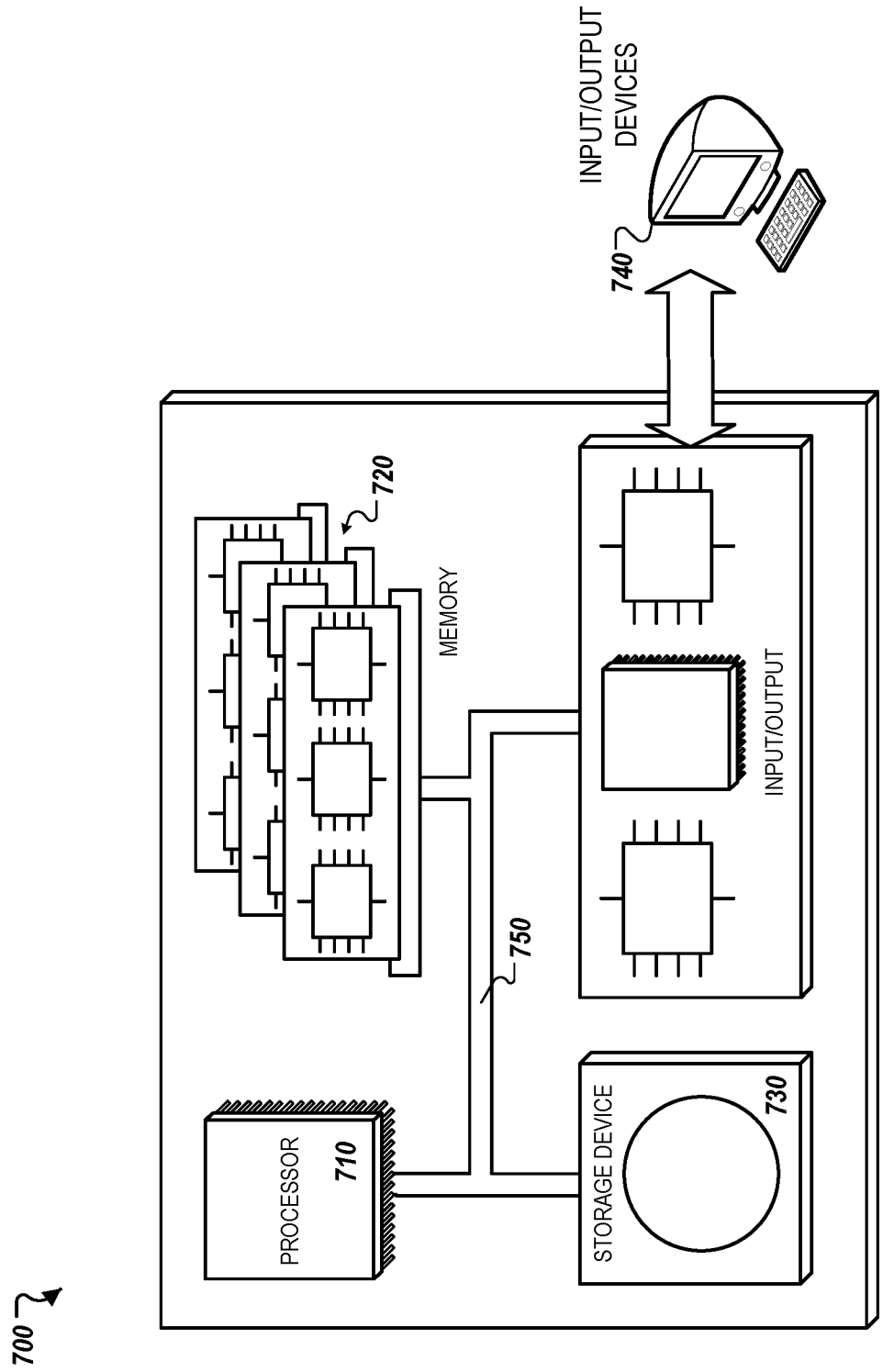
FIG. 7 illustrates a schematic diagram of a computer system that may be applied to any of the computer-implemented methods and other techniques described herein.

FIG. 7 illustrates a schematic diagram of a computer system 700 that may be applied to any of the computer-implemented methods and other techniques described herein. The system 700 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 700) and their structural equivalents, or in combinations of one or more of them. The system 700 is intended to include various forms of digital computers, such as laptops, desktops, workstations, personal digital assistants, servers, blade servers, mainframes, and other appropriate computers, including vehicles installed on base units or pod units of modular vehicles. The system 700 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 740. The processor 710 is capable of processing instructions for evaluation within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for evaluation by a programmable processor; and method steps can be performed by a programmable processor evaluating a program of instructions to perform functions of the described implementations by operating on input data and generating output. The described features can be implemented advantageously in one or more computer programs that are evaluable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the evaluation of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for evaluating instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more processors, the method comprising:
   identifying a baseline expression specifying a first element and a second element that are each to be evaluated on a primary thread of the one or more processors;
   determining that evaluation of the second element within the baseline expression involves accessing at least one external resource;
   based on determining that evaluation of the second element within the baseline expression involves accessing the at least one external resource, grouping the first element and the second element into a parse tree representation, the parse tree representation comprising a hierarchal structure of nodes reflecting a manner in which the first element and the second element are evaluated in multiple threads associated with the one or more processors;
   generating a transformed expression corresponding to the baseline expression based on the hierarchal structure of nodes specified by the parse tree representation,
      wherein the transformed expression comprises instructions that, when the transformed expression is evaluated by one or more processors, cause the one or more processors to:
         (i) evaluate the first element in the primary thread, and
         (ii) evaluate the second element in a secondary thread that runs in parallel with the primary thread; and
      providing the transformed expression for output.

2. The method of claim 1, wherein:
   the hierarchal structure of nodes comprises (i) a root node, and (ii) intermediate nodes descending within the hierarchal structure from the root node;
   the intermediate nodes comprise one or more intermediate nodes having one or more child nodes descending within the hierarchal structure from the one or more intermediate nodes.

3. The method of claim 1, wherein:
   the transformed expression is coded in a declarative programming language; and
   the first element and the second element are each associated with an imperative programming language executed by the one or more processors.

4. The method of claim 1, wherein the instructions cause the first element to be evaluated prior to evaluation of the second element.

5. The method of claim 1, wherein generating the transformed expression corresponding to the baseline expression comprises reconstructing a first text segment of the baseline expression to generate a second text segment for the transformed expression.

6. The method of claim 1, wherein the parse tree representation identifies computation dependencies of computer-executable elements of the baseline expression.

7. The method of claim 1, wherein:
the baseline expression is coded in a declarative programming language developed using an application development platform; and
determining that evaluation of the second element within the baseline expression involves accessing at least one external resource by determining that evaluation of the second element within the baseline expression involves accessing a resource external to the application development platform.

8. A system comprising:
one or more computing devices; and
one or more storage devices storing instructions that, when executed by the one or more computing devices, cause the one or more computing devices to perform operations comprising:
identifying a baseline expression specifying a first element and a second element that are each to be evaluated on a primary thread of one or more processors of the one or more computing devices;
determining that evaluation of the second element within the baseline expression involves accessing at least one external resource;
based on determining that evaluation of the second element within the baseline expression involves accessing the at least one external resource, grouping the first element and the second element into a parse tree representation, the parse tree representation comprising a hierarchal structure of nodes reflecting a manner in which the first element and the second element are evaluated in multiple threads associated with the one or more processors;
generating a transformed expression corresponding to the baseline expression based on the hierarchal structure of nodes specified by the parse tree representation,
wherein the transformed expression comprises instructions that, when the transformed expression is evaluated by one or more processors, cause the one or more processors to:
(i) evaluate the first element in the primary thread, and
(ii) evaluate the second element in a secondary thread that runs in parallel with the primary thread; and
providing the transformed expression for output.

9. The system of claim 8, wherein:
the hierarchal structure of nodes comprises (i) a root node, and (ii) intermediate nodes descending within the hierarchal structure from the root node;
the intermediate nodes comprise one or more intermediate nodes having one or more child nodes descending within the hierarchal structure from the one or more intermediate nodes.

10. The system of claim 8, wherein:
the transformed expression is coded in a declarative programming language; and
the first element and the second element are each associated with an imperative programming language executed by the one or more processors.

11. The system of claim 8, wherein the instructions cause the first element to be evaluated prior to evaluation of the second element.

12. The system of claim 8, wherein generating the transformed expression corresponding to the baseline expression comprises reconstructing a first text segment of the baseline expression to generate a second text segment for the transformed expression.

13. The system of claim 8, wherein the parse tree representation identifies computation dependencies of computer-executable elements of the baseline expression.

14. The system of claim 8, wherein:
the baseline expression is coded in a declarative programming language developed using an application development platform; and
determining that evaluation of the second element within the baseline expression involves accessing at least one external resource by determining that evaluation of the second element within the baseline expression involves accessing a resource external to the application development platform.

15. At least one non-transitory computer-readable storage device storing instructions that, when executed by one or more processors, cause the one or more processors to perform operations comprising:
identifying a baseline expression specifying a first element and a second element that are each to be evaluated on a primary thread of the one or more processors;
determining that evaluation of the second element within the baseline expression involves accessing at least one external resource;
based on determining that evaluation of the second element within the baseline expression involves accessing the at least one external resource, grouping the first element and the second element into a parse tree representation, the parse tree representation comprising a hierarchal structure of nodes reflecting a manner in which the first element and the second element are evaluated in multiple threads associated with the one or more processors;
generating a transformed expression corresponding to the baseline expression based on the hierarchal structure of nodes specified by the parse tree representation,
wherein the transformed expression comprises instructions that, when the transformed expression is evaluated by one or more processors, cause the one or more processors to:
(i) evaluate the first element in the primary thread, and
(ii) evaluate the second element in a secondary thread that runs in parallel with the primary thread; and
providing the transformed expression for output.

16. The non-transitory computer-readable storage device of claim 15, wherein:
the hierarchal structure of nodes comprises (i) a root node, and (ii) intermediate nodes descending within the hierarchal structure from the root node;
the intermediate nodes comprise one or more intermediate nodes having one or more child nodes descending within the hierarchal structure from the one or more intermediate nodes.

17. The non-transitory computer-readable storage device of claim 15, wherein:

the transformed expression is coded in a declarative programming language; and the first element and the second element are each associated with an imperative programming language executed by the one or more processors.

18. The non-transitory computer-readable storage device of claim 15, wherein the instructions cause the first element to be evaluated prior to evaluation of the second element.

19. The non-transitory computer-readable storage device of claim 15, wherein generating the transformed expression corresponding to the baseline expression comprises reconstructing a first text segment of the baseline expression to generate a second text segment for the transformed expression.

20. The non-transitory computer-readable storage device of claim 15, wherein the parse tree representation identifies computation dependencies of computer-executable elements of the baseline expression.

* * * * *